United States Patent Office 3,826,822
Patented July 30, 1974

3,826,822
LIQUID INSECTICIDAL COMPOSITIONS FOR IMPREGNATION OF SOLID SUPPORTS FOR PROLONGED DIFFUSION
Louis Moulin, Tassin la Demi-Lune, Maurice Confino, Saint-Cyr au Mont d'Or, and Gerard Godard, Saint-Clair du Rhone, France, assignors to PEPRO, Societe pour le Developpement et la Vente de Specialities Chimiques, Lyon, France
No Drawing. Filed Jan. 10, 1972, Ser. No. 216,791
Claims priority, application France, Jan. 8, 1971, 7101208
Int. Cl. A01n 9/28, 9/36
U.S. Cl. 424—27                                     8 Claims

ABSTRACT OF THE DISCLOSURE 5 to 50% by weight of an acetal of formula $$RC\overset{O}{\underset{O}{\diagup}}\hspace{-0.5em}\diagdown A$$

in which:

R is an alkyl radical containing 7 to 11 carbon atoms or a phenyl radical, possibly substituted by a lower alkyl.
A is a linear or branched alkyl chain containing from 2 to 5 carbon atoms, possibly substituted by one or more hydroxyl groups;

are added to 2,2 dichlorovinyldimethyl phosphate. (DDVP) to provide an insecticidal composition in which the DDVP is more uniformly released over an extended period.

---

The present invention relates to volatile liquid insecticidal compositions, and more particularly to such compositions for use in the impregnation of solid supports allowing regular and prolonged diffusion into the atmosphere of an active material for the destruction of insects.

In particular, the invention includes the use of liquid compositions based on 2,2 dichlorodivinyldimethyl phosphate, an insecticide widely used in this type of device for progressive release into the atmosphere.

Such compositions known to date present a number of drawbacks. In effect, because of its chemical structure, 2,2 dichlorovinyldimethyl phosphate, hereafter referred to in this specification as DDVP, is characterized by considerable instability in the presence of moisture in the air and, because of this, the use of solid supports impregnated with pure DDVP with a view to slow-release is limited, since after a few days of evaporation, a large proportion of the DDVP, already degraded, becomes inactive. In order to combat this inconvenience, various hydrophobic solvents have been proposed. However, in addition to the problem of DDVP degradation must be added that of the quality of the diffusion. This diffusion must be slow and as regular as possible. If a large amount of DDVP evaporates from the support during the initial period of use, the surrounding atmosphere contains a high dosage level of the insecticide and a toxic effect may endanger the user.

The use of different additives such as animal fats, natural waxes, cotton-seed oil, phenols, hydroquinones, naphthols, hexylresorcinols and lead salts, allow a slowing-down of the diffusion during the first days of use, and some regularization throughout this period, but this regularization takes place at the expense of the performance of the device. Indeed, if the diffusion of the solutions is regularized, this is partly because some of the DDVP is withheld. A quantitative evaluation, for example at the end of three months, demonstrates that diffusion stops when the ratio of the quantity of DDVP impregnated to the quantity of DDVP evaporated is in the region of 50%. This means that a large proportion of the active material impregnated at the beginning remains in the support and is not used.

Compositions according to the present invention circumvent these inconveniences by facilitating, on the one hand, the slow and regular diffusion and, on the other hand, an optimum utilization, the ratio of DDVP impregnated/DDVP evaporated exceeding 90%.

Thus, the compositions according to the present invention contain in addition to the DDVP, and possibly the solvents in current use, 5 to 50% by weight (based on the DDVP) of an acetal of the general formula:

$$RC\overset{O}{\underset{O}{\diagup}}\hspace{-0.5em}\diagdown A$$

in which:

R is an alkyl radical containing 7 to 11 carbon atoms or a phenyl radical, possibly substituted by a lower alkyl.
A is a linear or branched alkyl chain containing from 2 to 5 carbon atoms, possibly substituted by one or more hydroxyl groups;

A can, for example, represent the following chains:

$-CH_2-CH_2-$; $-CH_2-CH_2-CH_2-$; $-CH_2-CH-CH_2-$;
$\hspace{8em}\underset{\hspace{0.5em}OH}{|}$ $-CH_2-CH-$.
$\hspace{1.2em}\underset{\hspace{0.5em}CH_2OH}{|}$ The importance of the products according to the present invention is demonstrated by various tests in which the acetal used was the acetal of glycerylbenzaldehyde.

Three compositions A, B and C were prepared containing:

| Composition A: | Percent |
|---|---|
| DDVP | 40 |
| Dibutyl phthalate | 60 |
| Composition B (according to the invention): | |
| DDVP | 40 |
| Dibutyl phthalate | 50 |
| Acetal of glyceryl-benzaldehyde | 10 |
| Composition C: | |
| DDVP | 100 |

Three series of six cellulose strips, 6 cm. x 12 cm. x 1 cm., were impregnated with 25 g. of pure DDVP in the first set, 25 g. of composition A in a second set, and 25 g. of composition B in a third set.

The strips were then placed in a chamber of 80 m.³ for 90 days at a temperature of 20–25° C. Checks were made every 10 days on the quantities of DDVP evaporated and the quantities remaining impregnated. The following table summarizes the different results obtained:

|  | Percentages of DDVP evaporated | | |
|---|---|---|---|
|  | A | B | C |
| Number of days: | | | |
| 10 | 14 | 15 | 15 |
| 20 | 22 | 28 | 25 |
| 30 | 29 | 42 | 31 |
| 40 | 35 | 53 | 37 |
| 50 | 40 | 62 | 42 |
| 60 | 45 | 69 | 46 |
| 70 | 58 | 76 | 49 |
| 80 | 58 | 82 | 52 |
| 90 | 60 | 91 | 53 |

These results show very well that the composition according to the present invention permits the evaporation of more than 90% of the active material while, over a similar period of time, a composition without the acetal (type A) only liberates 60%, and only 53% evaporates if DDVP is employed pure. It can also be seen that this is without change in the regularity of the evaporation which remains at a fairly constant rate throughout the period of the test.

Biological efficiency tests of these same strips on adult flies (*Musca domestica*) have been carried out by using an 8 cm.³ Peet-Grady chamber. The mortality rates of the flies are summarized in the following table, whereby the figures given correspond to the percentage of flies killed after two hours exposure.

|  | Mortality | |
|---|---|---|
|  | Composition B | Composition A |
| At the end of— | | |
| 1 month | 98 | 98 |
| 2 months | 97 | 95 |
| 3 months | 96 | 70 |

Other series of tests have been conducted on the storage stability of strips impregnated in this way. The strips were enclosed in hermetically sealed sachets (made up of a complex based on paper, polyethylene and aluminum) held at a temperature of 50° C. for six months. At the end of this experiment, it was shown by gas chromatography that less than 1% of the DDVP contained in the strips impregnated with the composition according to the invention had been degraded.

Good results were also obtained with the acetal of glyceryl p-methylbenzaldehyde. In the manner described, the compositions according to the present invention permit a slow liberation by evaporation of the active material, a reduction of its retention, an increased biological activity after three months and shows high stability towards time and temperature.

This new composition is of particular value for the impregnation of solid supports which allow a slow diffusion of an active material such as DDVP into the air contained in an inhabited space for the destruction of all insects for a period of several months.

It will be obvious to those skilled in the art that various changes may be made without departing from the scope of the invention and the invention is not to be considered limited to what is described in the specification.

What is claimed is:
1. A volatile liquid insecticidal composition for impregnation of an impregnable solid support in an amount sufficient to provide a prolonged diffusion of volatile insecticide in the atmosphere, said composition comprising an insecticidally effective amount of the active insecticide 2,2 - dichlorovinyldimethyl phosphate, and from 5 to 50% by weight in relation to the active insecticide of the acetal of glycerylbenzaldehyde or glyceryl p-methylbenzaldehyde.
2. The composition of claim 1 wherein said acetal is the acetal of glycerylbenzaldehyde.
3. The composition of claim 1 wherein said acetal is the acetal of glyceryl p-methylbenzaldehyde.
4. The composition of claim 1 further comprising a solvent for said active insecticide.
5. The composition of claim 4 wherein said acetal is the acetal of glycerylbenzaldehyde.
6. An impregnable solid support impregnated with an insecticidally effective amount of the volatile liquid insecticidal composition of claim 1.
7. The composition of claim 6 wherein said solid support comprises a cellulose strip.
8. A method of killing insects which comprises exposing said insects to the prolonged diffusion in the atmosphere of an insecticidally effective amount of the composition of claim 1·

References Cited
UNITED STATES PATENTS

| 3,608,062 | 9/1971 | Alfes et al. | 424—219 X |
| 2,588,407 | 3/1952 | Newman et al. | 260—340.9 X |
| 2,967,798 | 1/1961 | Bruce | 424—354 X |
| 3,318,769 | 5/1967 | Folckemer et al. | 424—219 X |
| 3,542,810 | 11/1970 | Roudabosh et al. | 424—278 X |
| 3,644,423 | 2/1972 | Roswell et al. | 260—340.9 |
| 2,844,593 | 7/1958 | Riener et al. | 260—340.9 X |

OTHER REFERENCES

Chemical Abstracts, 53:15462h (1959).
Newman et al.: J. Am. Chem. Soc., pp. 2112–15 (1946).

ALBERT T. MEYERS, Primary Examiner
L. SCHENKMAN, Assistant Examiner

U.S. Cl. X.R.
424—219, 278